United States Patent [19]

Downing et al.

[11] 4,379,805

[45] Apr. 12, 1983

[54] GRAPHICS-BEARING ELEMENT AND FLUID LINE MARKING TAPE

[75] Inventors: Gerald T. Downing, Port Washington; Michael D. Savagian, Milwaukee, both of Wis.

[73] Assignee: W. H. Brady Co., Milwaukee, Wis.

[21] Appl. No.: 243,788

[22] Filed: Mar. 16, 1981

[51] Int. Cl.3 .............................. C09J 7/02; B32B 3/14

[52] U.S. Cl. ...................................... 428/346; 428/352; 428/353; 428/354; 428/355; 428/423.7; 428/480; 428/483; 428/524; 428/200; 428/206; 428/207; 428/209; 525/61; 40/360

[58] Field of Search .................. 525/61; 428/352, 346, 428/353, 35 A, 202, 204, 407, 200, 480, 437, 355, 524, 423.7, 483; 260/42.51

[56] References Cited

U.S. PATENT DOCUMENTS

| | | | |
|---|---|---|---|
| 3,067,054 | 12/1962 | Reese | 428/501 X |
| 3,312,563 | 4/1967 | Rusch | 428/353 X |
| 4,126,597 | 11/1978 | Walrath et al. | 525/61 X |
| 4,188,437 | 2/1980 | Rohowetz | 428/354 X |
| 4,303,718 | 12/1981 | Snelgrove | 428/437 |

*Primary Examiner*—P. Ives

[57] ABSTRACT

A graphics-bearing element is provided in which improved durability in liquid environments is provided through inclusion in a graphics layer of polyvinyl formal resin.

10 Claims, 1 Drawing Figure

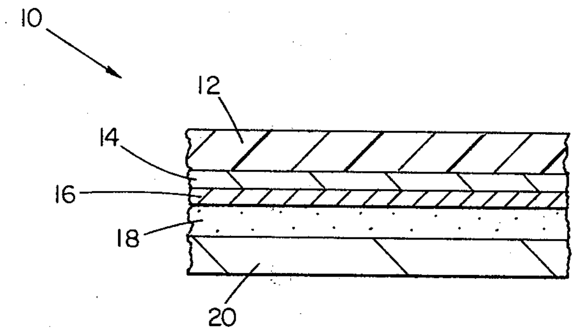
10
12
14
16
18
20

GRAPHICS-BEARING ELEMENT AND FLUID LINE MARKING TAPE

FIELD OF THE INVENTION

This invention relates to graphics bearing elements highly resistant to liquids, and in particular to a heat-activated fluid line marking tape useful in aircraft environments.

BACKGROUND OF THE INVENTION

The prior art has had difficulty providing marking labels suitably resistant to environments of hydraulic fluid, oils, aircraft fuels and other liquids.

SUMMARY OF THE INVENTION

We have found that products of highly desirable durability in such environments may be provided through using in the ink of a graphic layer a polyvinyl formal resin. In preferred embodiments, the polyvinyl formal resin is present in amount in the range of 25–50%, is tied to a transparent polyester layer through a primer layer, and carries on the side of the laminate away from the polyester layer a heat-activatable adhesive layer.

PREFERRED EMBODIMENT

We turn now to a presently preferred embodiment of the invention.

DRAWING

There is shown in the drawing a diagrammatic vertical sectional view, partially broken away, through a preferred embodiment of the invention.

DESCRIPTION

Turning now to the FIGURE, there is shown a fluid line marking tape indicated generally at 10. It includes a layer of 92 gauge transparent polyester 12, a primer layer 14, an ink graphics layer 16, an adhesive layer 18, and a release liner 20.

In the preferred embodiment disclosed, the primer formulation is as follows (by weight):

| | |
|---|---|
| Example 1 | |
| 49002 polyester resin (DuPont) | 2% |
| Desmodur N-100 polyisocyanate | 0.2% |
| Methylene Chloride | 7.8% |
| Cyclohexanone | 8% |
| 1,1,1 Trichloroethane | 64% |
| Nitroethane | 18% |

Preferred formulations for four specific colored inks are as follows:

| Color | % by Weight | Material |
|---|---|---|
| Example 2 | | |
| Black | 12.5% | carbon black |
| | 12.5% | Formvar 7/95* |
| | 37.5% | n-propanol |
| | 37.5% | nitroethane |
| Example 3 | | |
| White | 30.0% | titanium dioxide |
| | 12.0% | Formvar 7/95 |
| | 29.0% | n-propanol |
| | 29.0% | nitroethane |
| Example 4 | | |
| Yellow | 12.8% | Ciba-Geigy X-3218 |
| | | Regal Yellow Medium |
| | 12.8% | Ciba-Geigy X-2283 |
| | | Golden Cadmium Yellow |
| | 10.3% | Formvar 7/95 |
| | 32.05% | n-propanol |
| | 32.05% | nitroethane |
| Example 5 | | |
| Blue | 18.33% | titanium dioxide |
| | 8.33% | Ciba-Geigy X-2285 |
| | | C.P.Ar. Blue |
| | 0.12% | carbon black |
| | 13.44% | Formvar 7/95 |
| | 29.89% | n-propanol |
| | 29.89% | nitroethane |

*Trademark of Monsanto.

The pigments set forth in the above formulations are of the character known in the art as "halogen-free".

The preferred adhesive formulation is (by weight):

| | |
|---|---|
| Example 6 | |
| 49001 Polyester Resin (DuPont) | 40% |
| Mondur SH (Blocked Polyisocyanate) | 10% |
| Methyl Ethyl Ketone | 50% |

In manufacture, about five pounds of primer (dry basis) are applied per ream of polyester film 12. The primer is then dried to produce primer layer 14, which is then flexographically printed, over the primer 14, with ink graphics layer 16, which includes a last flood coat of white for opacity.

Adhesive layer 18 is first cast on the release-coated liner 20 following which the subunit 18, 20 is laminated to the subunit 12, 14, 16.

The tape may be applied by wrapping onto a clean metal surface. Adhesive layer 18 may then be cured by heating to at least 270° F.

The ink graphics layer 16 is preferably applied using a plate formed from the ultraviolet-curable DuPont material sold by it under the mark "CYREL".

OTHER EMBODIMENTS

A preferred general formula for use in graphic layers according to the invention is as follows:

| % by Weight | Material |
|---|---|
| 8–30% | Halogen free pigment |
| 8–20% | Monsanto "Formvar" polyvinyl formal resin |
| 20–40% | ethanol, isopropanol, or n-propanol |
| 20–40% | nitromethane, nitroethane, 1-nitropropane, or 2-nitropropane |

In the final product, after evaporation of the solvent, the polyvinyl formal resin is present in amount in the range of 25–50%.

What is claimed is:

1. A graphics-bearing marking element comprising an ink graphics layer comprising a polyvinyl formal resin present in an amount by weight in the range of 21% to 71% and having an exposed portion and providing marking indicia.

2. The element of claim 1 in which said resin is present in an amount by weight in the range of 25 percent to 50 percent.

3. The element of claim 1 which includes halogen-free pigment.

4. The element of claim 3 which includes a layer of heat-activatable adhesive comprising polyester resin with a blocked polyisocyanate.

5. The element of claim 1 which includes a transparent plastic layer.

6. The element of claim 1 which includes a primer layer between said graphics layer and said plastic layer.

7. The element of claim 4 or 5 which is a fluid line marking tape.

8. The element of claim 6 which is a fluid line marking tape.

9. The element of claim 6 wherein said primer comprises polyester resin with polyisocyanate.

10. The element of claim 5 wherein said transparent plastic layer comprises polyester.

* * * * *